United States Patent
Gerrits

(10) Patent No.: US 7,508,557 B2
(45) Date of Patent: Mar. 24, 2009

(54) SYSTEM AND METHOD FOR PROCESSING A MULTI-COLOUR IMAGE

(75) Inventor: Carolus E. P. Gerrits, Velden (NL)

(73) Assignee: OCE Technologies B.V., Venlo (NL)

( * ) Notice: Subject to any disclaimer, the term of this patent is extended or adjusted under 35 U.S.C. 154(b) by 717 days.

(21) Appl. No.: 11/069,569

(22) Filed: Mar. 2, 2005

(65) Prior Publication Data

US 2005/0195420 A1 Sep. 8, 2005

(30) Foreign Application Priority Data

Mar. 3, 2004 (EP) .................................. 04075679

(51) Int. Cl.
*G06K 1/00* (2006.01)
*G06F 15/00* (2006.01)
(52) U.S. Cl. ........................ 358/518; 358/1.9
(58) Field of Classification Search .................. 358/1.1, 358/1.13, 518, 500, 1.9, 3.01, 515, 519; 382/162, 382/167, 254; 345/589, 593, 597, 603, 604
See application file for complete search history.

(56) References Cited

U.S. PATENT DOCUMENTS

| | | | | |
|---|---|---|---|---|
| 5,311,212 A | * | 5/1994 | Beretta | ........................ 345/591 |
| 5,528,386 A | * | 6/1996 | Rolleston et al. | ............ 358/522 |
| 5,982,924 A | * | 11/1999 | Power et al. | ................. 382/162 |
| 6,072,513 A | * | 6/2000 | Agano | ......................... 347/188 |
| 6,352,806 B1 | | 3/2002 | Dalal | |
| 6,459,501 B1 | | 10/2002 | Holmes | |
| 2004/0021886 A1 | * | 2/2004 | Boesten | ...................... 358/1.9 |

FOREIGN PATENT DOCUMENTS

EP 0 373 704 A1 6/1990
EP 0 741 490 A1 11/1996

OTHER PUBLICATIONS

Harold Boll, A Color to Colorant Transformation for a Seven Ink Process, SPIE vol. 2170.*
Ostromoukhov. "Chromaticity gamut enhancement by heptatone multi-color printing", Proceedings of the SPIE, SPIE- Bellinghan, VA, vol. 1909, Jun. 1993, pp. 139-151.

* cited by examiner

*Primary Examiner*—Gabriel I Garcia
(74) *Attorney, Agent, or Firm*—Birch, Stewart, Kolasch & Birch, LLP

(57) ABSTRACT

A system and method are provided for processing digital multi-color images for the reproduction thereof on a color printing and/or copying device provided with a plurality of process colors defining a gamut. The system includes a color processing module, which divides the gamut into multiple sub-gamuts, each defined by three chromatic process colors, and which selects for each pixel of the digital multi-color image the corresponding sub-gamut. For each pixel it is judged whether or not to add a non-white achromatic process color or blue to the process colors defining the corresponding sub-gamut.

21 Claims, 1 Drawing Sheet

SYSTEM AND METHOD FOR PROCESSING A MULTI-COLOUR IMAGE

This application claims the priority benefit of European Patent Application No. 04075679.3 filed on Mar. 3, 2004, which is hereby incorporated by reference.

BACKGROUND OF THE INVENTION

1. Field of the Invention

The present invention is related to the processing of multi-colour images for reproduction on a printing or copying system. Particularly of interest are systems provided with at least five process colours for rendering these multi-colour images.

2. Discussion of the Related Art

Hereinafter, reference will be made to a multi-colour reproduction system being a multi-colour printing and/or copying system. In this disclosure, colour means all colours including black and white and all shades of grey.

In digital colour printing, continuous tones are rendered by halftoning the separation images in the process colours. The process colours are a limited number of colours of marking particles available on the multi-colour image reproduction system to render a colour image. Usually a distinction can be made among colour printing systems based on the kind of marking particles used, e.g. ink or toner, the imaging process employed, e.g. magnetography, or electro(photo)graphy, or inkjet, the productivity or the media range.

A distinction can however also be made dependent on the available number of process colours. The process colours correspond to the colours of the respective coloured marking particles available in the system such as e.g. black, white, cyan, magenta, yellow, orange, pink, red, green and blue. By selecting a number of process colours for a colour image reproduction system, one fixes the range of colours which can be produced by the colour image reproduction system, or in other words the gamut.

Most image reproduction systems employ the three classic chromatic colours: cyan (C), magenta (M) and yellow (Y), i.e. the so-called subtractive colours, and in most cases additionally black (K). The achievable gamut with the process colours of cyan, magenta, yellow and black is usually more restricted than the gamut of the image to be reproduced. To extend the gamut, more process colours need to be added. Typical process colour sets existing nowadays include sets of cyan, magenta, yellow and red, or of cyan, magenta, yellow, orange and green, or of the subtractive colours and red (R), green (G) and blue (B), the so-called additive colours, to extend the gamut respectively in the red, green and blue colours. To each of the afore-mentioned sets, the process colour black may be added.

When reproducing colour images, and particularly contone images, these images are processed by the colour image reproduction system such as to generate digital colour separation images in the process colours. The respective digital colour separation images are halftoned for enabling printing. Usually each colour separation image is halftoned using a different screen. A disadvantage of this approach employing a plurality of different screens, however, is its sensitivity for creating Moiré patterns. Moiré patterns are visible distortions in a rendered multi-colour image caused by interference patterns generated by combining halftone screens. Although it is known that the visible effect of Moiré patterns can be reduced by angling the halftone screens using predetermined screen angles, avoiding Moiré becomes particularly troublesome in colour image reproduction systems where four or more process colours can be printed. Thus in order to avoid Moiré the number of screens should be limited.

To meet this requirement, nowadays multi-colour image reproduction systems provided with the process colours yellow, magenta, cyan, red, green, blue and black exist wherein colour images are printed using the approach, for instance, as disclosed by Victor Ostromoukhov in "Chromaticity gamut enhancement by heptatone multi-color printing", SPIE Proceedings 1993, Vol. 1909, pp.139-151. According to this approach, each pixel of a colour image is printed using a selection of at most three out of seven process colours, namely two chromatic colours: one additive primary colour (one of RGB) and one subtractive secondary colour (one of YMC) and an achromatic colour: black (K). As a consequence, in the heptatone printing process as disclosed by Ostromoukhov, the available gamut is divided in six sub-gamuts: KRY, KRM, KBM, KBC, KGC and KGY.

A first disadvantage of this approach is that a grey tone can only be printed with dots of black marking particles and thus, particularly at low image densities, the printed images are highly sensitive to graininess. Graininess is a perceived feature of a rendered colour which is among others related to how uniformly the coloured marking particles have been formed on the medium. Apart from image coverage, lightness differences and particularly unintentional variations in lightness differences determine to a large extent the amount of graininess. The higher the lightness differences are the more sensitive the printed images are with respect to graininess. Lightness differences include differences in lightness between non-overlapping dots of marking particles of different process colours, and in case superimposed multi-colour image reproduction systems are used, differences in lightness between non-overlapping dots of superimposed marking particles of different process colours. Usually the primary source for graininess is the lightness difference between the darkest colour, for instance black, and the lightest process colour present in the image such as for instance yellow.

A further disadvantage of the approach disclosed by Ostromoukhov is that each sub-gamut comprises only two chromatic process colours and thus a coloured pixel can only be printed with at most two chromatic process colours. Besides that the availability of only two chromatic process colours negatively affects graininess at low image densities, this also limits the ability for faithful colour reproduction of for instance photos and particularly e.g. image parts of light shades of pastel colours.

SUMMARY OF THE INVENTION

It is an object of the invention to provide a system and method for processing multi-colour images for the reproduction thereof on a colour image reproduction system provided with at least five process colours with no or at least a limited sensitivity for graininess, particularly at low image densities.

It is a further object of the present invention to provide a system and method for processing digital multi-colour images for the reproduction thereof on a colour image reproduction system provided with at least five process colours wherein each pixel of the multi-colour images is rendered using up to three chromatic process colours while avoiding or at least limiting Moiré.

It is another object of the present invention to provide a system and method for processing digital multi-colour images, which overcome the limitations and disadvantages associated with the related art.

In an aspect of the invention, an image processing system is provided for processing a digital multi-colour image for reproduction thereof on a colour image reproduction system which is provided with at least five process colours defining a gamut, the image processing system comprising: a colour processing module for dividing the gamut into a plurality of sub-gamuts such that each sub-gamut is defined by a set of three chromatic process colours of the at least five process colours, and for selecting for each pixel of the digital multi-colour image a corresponding sub-gamut of the plurality of sub-gamuts; an analysis module for judging for each pixel of the digital multi-colour image whether or not to add an additional process colour to the set of process colours defining the corresponding sub-gamut of the pixel; and a generation module for generating image signals from the digital multi-colour image, each image signal being associated with a digital separation image of a process colour of the plurality of process colours and specifying an image density value for the associated process colour for each pixel of the digital multi-colour image, the image density value for the associated process colour for the pixel being zero if the associated process colour is not part of the set of process colours defining the corresponding sub-gamut.

According to an aspect of the invention, the division of the available gamut into sub-gamuts is preferably such that each set of three chromatic process colours defining a sub-gamut comprises a first process colour selected from the colours cyan, magenta and yellow, and a second process colour selected from the colours red, orange, green, blue, pink and brown. It is observed that the most faithful colour reproductions can be obtained when the first process colour and the second process colour are positioned adjacent to each other in a predetermined colour space. The available gamut is the gamut defined by all available process colours and may include chromatic as well as achromatic process colours. The achromatic colours are black, white and all shades of grey. In other words, the achromatic colours are all colours positioned substantially on the grey axis being the line connecting the white point with the black point.

According to an aspect of the present invention, each sub-gamut is defined by a set of three chromatic process colours. An additional process colour may be added to the set of process colours defining the sub-gamut, depending on the judgement of the analysis module. For each pixel of the multi-colour image a corresponding sub-gamut is selected and a judgement is performed by the analysis module whether or not to add an additional process colour to the set of process colours defining this corresponding sub-gamut. When it is judged for a pixel that no additional process colour is to be added, then this pixel is rendered using up to three chromatic process colours. In such case the black process colour is not used which is advantageous with respect to graininess, particularly in low density image regions or highlight areas. The analysis judges whether a pixel is part of such highlight area or not. Therefore, in an embodiment of the invention, the analysis module determines for each pixel of the digital multi-colour image a lightness value and, if the lightness value is smaller than a predetermined lightness threshold, a judgement is made to add the additional process colour to the set of process colours defining the corresponding sub-gamut of said pixel. The lightness threshold may be chosen independent of the sub-gamut. Alternately, a different lightness threshold may be chosen for some or all sub-gamuts e.g. dependent on the lightness values of the respective process colours defining the sub-gamut. One may even opt for a lightness threshold which varies from pixel to pixel, e.g. dependent upon the shortest distance between the position of the pixel in a predetermined colour space and the grey axis. The lightness threshold is typically a lightness value in the range from 20 to 90, or from 40 to 80.

In another embodiment of the invention, the analysis module determines for each pixel of the digital multi-colour image an area coverage value and, if the area coverage value equals or exceeds a predetermined area coverage threshold, a judgement is made to add the additional process colour to the process colours defining the corresponding sub-gamut of said pixel. The area coverage threshold may be chosen independent of the sub-gamut. Alternately, a different area coverage threshold may be chosen for some or all sub-gamuts. One may even opt for an area coverage threshold which varies from pixel to pixel. The area coverage threshold is typically a value in the range from 20% to 200%, or from 20% to 100%. When a pixel has an area coverage value of 100%, then to reproduce the pixel an area corresponding to the size of the pixel is to be fully covered with (a) dot(s) of marking particles. When the area coverage value of a pixel exceeds 100%, overlapping dots of marking particles are to be formed.

When the analysis module judges that an additional process colour is to be added to the set of process colours defining the corresponding sub-gamut of a pixel, then a non-white achromatic process colour, such as for instance black, or blue is added as additional process colour. Obviously, Blue can only added to the set of process colours defining a sub-gamut if that set does not already include blue. When a relatively small fraction of the additional process colour is to be added, then blue is preferred over black as additional process colour as blue has higher lightness compared to black and thus contributes less to graininess.

In an embodiment of the invention, the image processing according to the present invention further comprises a conversion module for converting the image signals of the respective process colours into corresponding printing signals by a halftoning technique using at most four different screens and wherein each image signal is converted into a corresponding printing signal using one screen selected from said at most four different screens.

In another aspect of the invention, a method is provided for processing a digital multi-colour image for reproduction thereof on a colour image reproduction system which is provided with at least five process colours defining a gamut, said method comprising the steps of: dividing the gamut into a plurality of sub-gamuts such that each sub-gamut is defined by a set of three chromatic process colours of the at least five process colours; selecting for each pixel of the digital multi-colour image a corresponding sub-gamut of the plurality of sub-gamuts; judging for each pixel of the digital multi-colour image whether or not to add an additional process colour to the set of process colours defining the corresponding sub-gamut of the pixel; and generating image signals from said digital multi-colour image, each image signal being associated with a digital separation image of a process colour of the plurality of process colours and specifying an image density value for the associated process colour for each pixel of the digital multi-colour image, the image density value for the associated process colour for the pixel being zero if the associated process colour is not part of the set of process colours defining the corresponding sub-gamut.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE PREFERRED EMBODIMENTS

Figure 1:
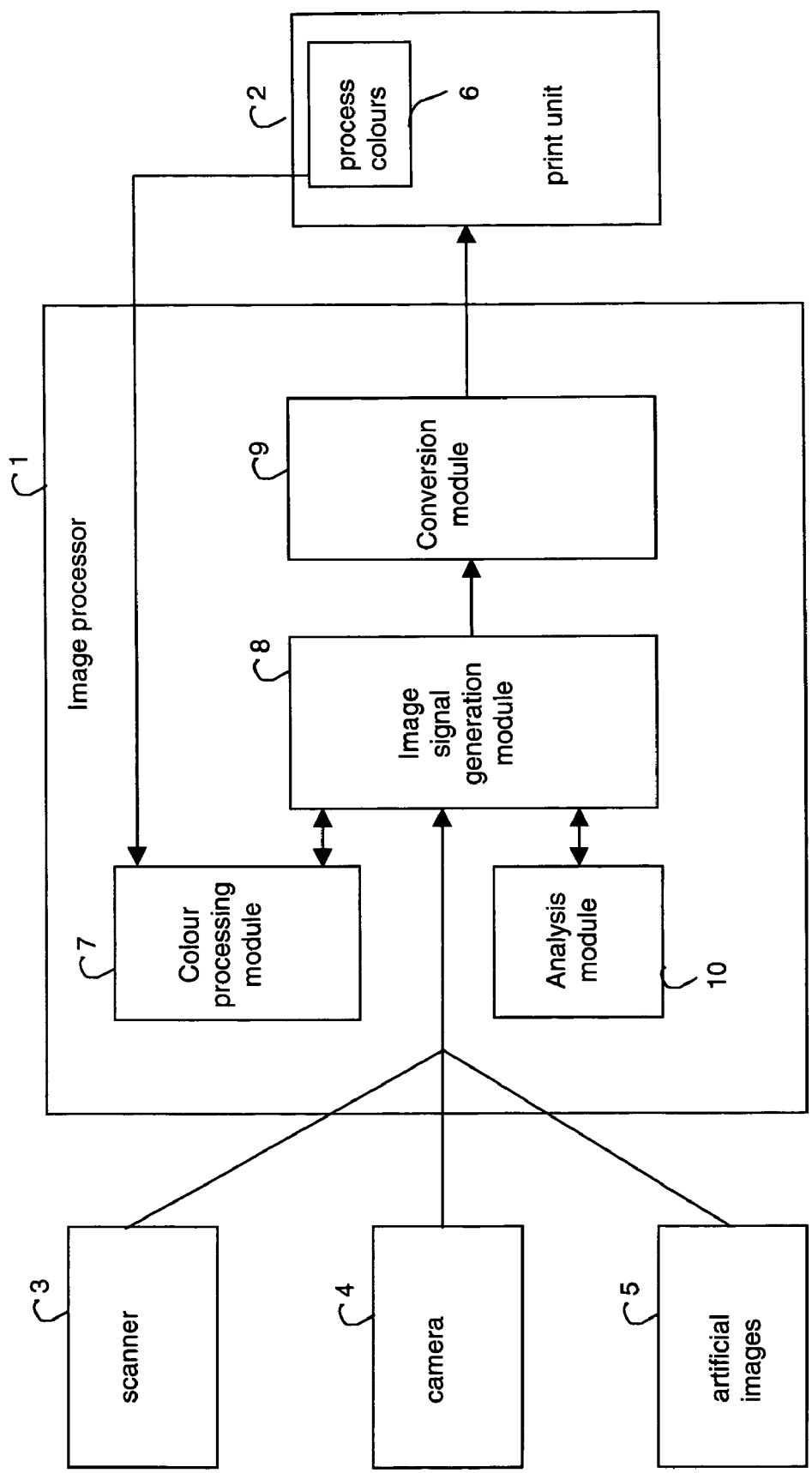
FIG. 1 depicts a schematic representation of a colour image reproduction system according to the present invention.

In relation to the appended drawings, the present invention is described in detail below. Several exemplary embodiments are disclosed. It is apparent however that a person skilled in the art can imagine other equivalent embodiments or other ways of executing the present invention, the scope of the present invention being limited only by the terms of the appended claims.

According to an embodiment of the invention, a digital colour image reproduction system, as depicted in FIG. 1 comprises an image processing system (1) and a printing unit (2), all operatively coupled. A digital multi-colour image may be offered to the digital image reproduction system for reproduction thereof. There are numerous ways to generate a digital image. For instance, a digital image may be generated by scanning an original using a scanner (3). The scanner can be part of the digital image reproduction system or may be coupled via a network or any other interface to the digital image reproduction system. Digital still images may also be generated by a camera or a video camera (4) which may be coupled via a network or any other interface, e.g. an IEEE1394 interface, to the digital image reproduction system. Besides digital images generated by a scanner or a camera, which are usually in a bitmap format or a compressed bitmap format also artificially created, e.g. by a computer program, digital images or documents (5) may be offered to the digital image reproduction system. The latter images are usually in a structured format including but not limited to a page description language (PDL) format and an extensible markup language (XML) format. Examples of a PDL format are PDF (Adobe), PostScript (Adobe), and PCL (Hewlett-Packard).

Regardless of the origin of the digital image, one may opt to store the digital image in a memory such that it can be easily retrieved by the image processing system 1 either directly or via any interface.

The image processing system (1) includes a colour processing module (7), an image signal generation module (8), a conversion module (9), and an analysis module (10), all operatively coupled.

The colour gamut that can be rendered by the digital image reproduction system depends on the number of process colours (6) and their respective colour values. The process colours (6) correspond to the colours of the marking particles available in the printing unit (2). Although the invention is clearly not limited thereto, suppose only as an example that the process colours (6) available in the printing unit (2) are the additive colours Red, Green, Blue, the subtractive colours Cyan, Magenta and Yellow and the achromatic colour blacK. The maximum colour gamut can be achieved by rendering each pixel of a digital image using all the process colours.

The colour processing module (7) divides the colour gamut achievable with these seven process colours on the digital image reproduction system into a plurality of sub-gamuts. This division is such that each sub-gamut is defined by a set of three chromatic process colours of the plurality of process colours. Some or all of these sub-gamuts may be at least partially overlapping. This means that points in a predetermined colour space may be contained in plural sub-gamuts. The colour processing module (7) determines for each such point the corresponding sub-gamut by selecting one of these plural sub-gamuts. An additional process colour may be added to each set of process colours defining the sub-gamuts.

With known techniques, a colour management system (not shown) may be used to match each pixel of a digital image with a point in the predetermined colour space. Thus each pixel can be rendered using up to four out of the seven available process colours without restricting the colour gamut of the digital image reproduction system. Whether or not an additional colour, such as for instance black or blue, is added to the set of three chromatic process colours defining a sub-gamut is determined by the analysis module (10).

The image signal generation module (8) of the image processing system generates a sequence of image signals for the process colours (6). Each image signal has a one-to-one relationship with a separation image of a particular process colour. The image signal specifies at least an image density value for the associated process colour for each pixel of the digital image. The image density value for the associated process colour for a pixel of the digital image is zero if that associated process colour is not part of the sub-gamut which is selected for that pixel by the colour processing module (7). An image density value is typically an 8-bit value which enables the use of 256 grey levels per process colour. The pixel size is usually the same for each process colour and, although not required, is usually chosen or tuned such that the pixel size corresponds to the image dot size of the printing unit. Preferably the sequence wherein the image signals are generated corresponds to the sequence wherein the separation images of coloured marking particles are formed by the printing unit.

The conversion module (9) converts the sequence of image signals by means of a halftone technique into a sequence of corresponding printing signals. Each printing signal indicates for each associated process colour for each pixel of the digital image whether an image dot of marking particles of that process colour is to be formed. This indication may be done using a single bit or multi-bit value depending on the halftoning capabilities of the printing unit. If the printing unit is capable of multi-level halftoning, a multi-bit value may be used, where the number of bits relates to the number of grey levels which can be reproduced per image dot of marking particles by the printing unit. Usually the printing unit is only capable of binary halftoning or in other words a single bit value, i.e. "0" or "1" indicating whether an image dot is to be formed or not. In principle, the image signals may be converted into printing signals by any halftone technique.

Examples of halftoning techniques are matrix-dithering, stochastic dithering, and error-diffusion or any combination thereof. Matrix dithering produces a raster of pixels arranged in a regular matrix structure of several different threshold values. In particular, a printing signal is built up from a raster of a two-dimensional matrix structure including threshold values being arranged in a predetermined order by comparing the image density value for the associated process colour for each pixel of the digital image with the corresponding threshold value. When employing stochastic dithering, the threshold values are arranged randomly. In error diffusion, the image density value for a process colour for a pixel is compared with a threshold value. The difference between these two values is distributed over the neighbouring pixels. The sequence of printing signals preferably corresponds to the sequence wherein the respective process colours are applied by the printing unit during image reproduction.

By means of example it will be now described how a digital multi-colour image can be reproduced using the digital colour image reproduction system as depicted in FIG. 1. Suppose for instance that an original multi-colour image is scanned at a resolution of 600 dpi×600 dpi resulting in a digital multi-colour image being composed of three separation images respectively of the colours red (R), green (G) and blue (B). The image signals associated with the respective separation images specify for each pixel of the respective colour an image density value using an 8-bit representation. An 8-bit representation enables to define 256 levels each corresponding with a particular tonal value. This digital multi-colour image is forwarded to the image processing system of a complementary digital colour image reproduction system provided with the KRGBCMY process colours. The gamut defined by the six chromatic process colours is divided by the colour processing module into a plurality of sub-gamuts such that each sub-gamut is defined by a set of three chromatic process colours of the six chromatic process colours.

There are numerous ways to perform such a division. In general, when making such a division, the position of the process colours in a predetermined colour space as well as the printing process implemented on the printing unit will be taken into account to determine the best division strategy. It is advantageous to perform the division such that each set of process colours defining a sub-gamut comprises a first process colour selected from the colours Cyan, Magenta and Yellow, and a second process colour selected from the colours Red, Green, Blue, the first process colour and the second process colour being positioned adjacent to each other in a predetermined colour space such as for instance CIE L*a*b*. For instance this could lead to four sub-gamuts defined by the following process colours YGR, GRM, GCM and CMB. As these four sub-gamuts are non-overlapping, for each pixel of the digital multi-colour image only one corresponding sub-gamut can be selected by the colour processing module.

According to the present invention, an alternative gamut division strategy will now be explained, which is particularly suited when the printing unit is a complementary printing unit. Therefore, although the invention is clearly not limited thereto, in the sequel reference will only be made to a complementary printing unit. In such a complementary printing unit, a multi-colour image of marking particles which is composed of a plurality of registered colour separation images is formed so that the marking particles of the respective process colours associated with the respective colour separation images are positioned contiguous to each other rather than in a superimposed relationship. A colour image reproduction system comprising a complementary printing unit is referred to as a complementary multi-colour image reproduction system. Such a complementary printing unit (2) typically comprises an image-carrying member which can be moved cyclically. The image-carrying member may be an image-forming or an image-receiving member. The image-carrying member is an endless member, e.g. a drum or belt, and may have a layered structure.

A number of process colours (6) are available on the complementary printing unit. Responsive to a sequence of printing signals, the complementary printing unit sequentially forms the respective separation images of marking particles of the corresponding process colour on the image-carrying member. The respective separation images of marking particles are formed complementary. This means that marking particles of a process colour are accumulated on the free surface of the image-carrying member and substantially not on coloured marking particles already accumulated on the image-carrying member. 'substantially not' means that any superimposed marking particles of different process colours may not lead to visual deficiencies, i.e., being visual with the naked human eye, in the finally printed image.

After the formation of the registered multi-colour image, the complementary printing unit subsequently transfers the multi-colour image of marking particles, optionally via one or more intermediate members, to a medium where it may be fixed simultaneously or thereafter. The medium can be in web or sheet form and may be composed of e.g. paper, cardboard, label stock, plastic or textile. The intermediate member may be an endless member, such as a belt or drum, which can be moved cyclically. The transfer to the medium or the intermediate member can be by means of pressure, or pressure and heat. Depending on the nature and resistivity of the marking particles, the transfer may be assisted electrostatically and/or magnetically and/or by means of a vibration force, e.g. sonically. An example of such a printing unit is disclosed in European Patent Application Publication No EP 0373704 A1 (Van Stiphout et al), which is hereby incorporated by reference. In that disclosure, the image-carrying member is a cylindrical drum having an outer layer of silicone rubber. Another example is disclosed in U.S. Pat. No. 6,352,806 (Dalal) where the image-carrying member is a belt having a photo-conductive outer layer.

According to this alternate gamut division strategy of the present invention, the colour processing module (7) divides the colour gamut achievable with the six chromatic process colours RGBYMC into all obtainable sub-gamuts defined by a set of three chromatic process colours. This yields the following sub-gamuts: RYG, RYC, RYB, RYM, RGC, RGB, RGM, RCB, RCM, RBM, YGC, YGB, YGM, YCB, YCM, YBM, GCB, GCM, GBM, CBM. The process colours may be specifically adapted for use in a complementary colour image reproduction system and are defined in the CIE-L*a*b* colour space (see Table 1) for a D50 light source and uncoated white paper.

TABLE 1

| Process colour | L* (lightness) | a* | b* |
| --- | --- | --- | --- |
| Blue | 29 | 18 | −54 |
| Red | 50 | 54 | 41 |
| Green | 52 | −64 | 23 |
| Cyan | 48 | −26 | −36 |
| Magenta | 52 | 64 | −23 |
| Yellow | 90 | −8 | 92 |

Primarily to avoid Moiré, only three screens may be used to render pixels in these sub-gamuts. When processing neighbouring or nearby pixels of a digital colour image, these pixels may slightly differ in colour but the difference may nevertheless be enough to locate them in different sub-gamuts. For instance a first pixel may be located in the GRC sub-gamut, while a second pixel is located in the adjacent YGR sub-gamut. The YGR and the GRC sub-gamut have two chromatic process colours (G and R) in common. For rendering pixels in the sub-gamuts defined, it is thus advantageous to associate each process colour with a single screen. Preferably in order not to reduce the available colour gamut, it is advantageous to distribute the process colours uniformly over the available screens. By doing so, for neighbouring or nearby pixels the transition from one sub-gamut to another adjacent sub-gamut may be effected without a significant visible effect as two out of three chromatic colours are the same and are rendered with the same screens.

The limitation to use maximum three screens and the fact that each process colour is associated with a single screen while distributing the process colours uniformly over the available screens imply a reduction in the total number of sub-gamuts which can be selected by the colour processing module.

The unique association of the respective chromatic process colours with the three screens is now further explained. As R and C, and G and M, and Y and B are complementary colours, there are plenty of segments comprising complementary chromatic process colours. We have observed experimentally that the most pleasant grey tone is produced employing the complementary process colours red and cyan. Therefore, the sub-gamuts comprising these process colours are determined to be: RCM, RCB, RCY and RCG. Subsequently, these four sub-gamuts are ordered with increasing first lightness value. The first lightness value of a sub-gamut is the maximum of the lightness differences between the respective chromatic process colours defining the sub-gamut. For instance, for RCM the first lightness value is four (being the difference of the lightness values of Cyan and Magenta, as in Table 1), while for RCB the first lightness value is twenty-one (being the difference between the lightness values of Red and Blue, as in Table 1). This yields the following order: RCM, RCG, RCB, RCY. Then, based on this lightness order, each of the respective chromatic process colours is associated with a single one of three different screens. By preference, process colours that are positioned adjacent to each other in the colour space, in this example CIE L*a*b*, are associated with a different screen since otherwise these process colours can not be part of the same sub-gamut which would reduce the colour gamut.

Starting with the sub-gamut with the lowest first lightness value RCM, for instance the first screen may be used to process Red, the second screen may be used to process Cyan, and the third screen may be used to process Magenta. As all process colours of the RCM sub-gamut are associated with a screen, we proceed to the subsequent sub-gamut based on the first lightness value order. This is the RCG sub-gamut. The only process colour not yet associated with a screen is Green. Green is associated with the only available screen, being screen 3 in this example. To distribute the process colours uniformly over the available screens, the remaining process colours Yellow and Blue are to be associated with screen 1 and screen 2. By preference, as Red and Yellow are process colours that are positioned adjacent to each other in the colour space, Blue is associated with screen 1, while Yellow is associated with screen 2.

Based on the screen association, the twenty sub-gamuts listed above are reduced to eight sub-gamuts being RYG, RYM, RGC, RCM, YGB, YBM, GCB, CBM, which in total cover the complete colour gamut determined by all six chromatic process colours and additionally black. For each of these remaining sub-gamuts, an associated second lightness value, which is in this example the lightness difference in the CIE L*a*b* colour space between the two chromatic process colours of the sub-gamut defining a plane positioned closest to the lightness axis, is determined. For instance, for the sub-gamut RYG, the two chromatic process colours defining the plane positioned closest to the lightness axis are Red and Green. The (absolute) lightness difference between these two colours (see Table 1) equals two, thus the second lightness value for the sub-gamut RYG equals two. For the sub-gamut YGB, the two chromatic process colours defining the plane positioned closest to the lightness axis are Yellow and Blue. The (absolute) lightness difference between these two colours (see Table 1) equals 61, thus the second lightness value for the sub-gamut YGB equals 61. The second lightness value can subsequently also be determined for the other six remaining sub-gamuts RYM, RGC, RCM, YBM, GCB, CBM. Eight sub-gamuts remain. In practice, as the medium is usually White, the sub-gamuts effectively are RYGW, YGBW, RYMW, RGCW, RCMW, YBMW, GCBW, CBMW.

Further according to this example, when processing pixels of the original multi-colour image, the analysis module judges for each pixel whether or not an additional process colour is to be added to the set of process colours defining the corresponding sub-gamut of the pixel. In particular, the analysis module determines for each pixel of the digital multi-colour image an area coverage value and, if the area coverage value equals or exceeds a predetermined coverage threshold, a judgement is made to add the additional process colour to the process colours defining the corresponding sub-gamut of that pixel. For instance, the analysis module may determine the area coverage value of a pixel by adding up the image densities values of the pixel, e.g. in RGB. The resulting number is multiplied with 100 and divided by the maximum image density value, thus yielding the area coverage value. Using an 8-bit representation according to this example, the image density values will range from 0 to 255, while the maximum image density value is 255. Suppose the coverage threshold is 50%, then if the area coverage value of the pixel is smaller than the threshold value of 50%, then this pixel will be rendered with the corresponding sub-gamut selected from RYGW, YGBW, RYMW, RGCW, RCMW, YBMW, GCBW, CBMW. In case the area coverage value exceeds the threshold value of 50%, for instance black will be added and thus the pixel will be rendered with the corresponding sub-gamut selected from RYGWK, YGBWK, RYMWK, RGCWK, RCMWK, YBMWK, GCBWK, CBMWK.

When an additional process colour is added to the set of process colours defining a sub-gamut, the same second lightness value remains associated with the extended sub-gamut.

From the eight remaining sub-gamuts, potentially extended blacK or Blue, the colour processing module determines for each point in the colour space (in this example CIE L*a*b*) those sub-gamuts which contain that point. If the point is contained in more than one sub-gamut, then, based on the second lightness value the colour processing module selects for that point one corresponding sub-gamut. With known techniques, a colour management system may be used to map and/or match each pixel of a digital image with a point in this CIE L*a*b* colour space. Thus each pixel can be rendered using up to three out of the six available chromatic process colours and optionally black or blue. Obviously, blue is not added if already contained in the sub-gamut.

Suppose for example a point is contained in two sub-gamuts, e.g. the RYG(W)K and the YGB(W)K sub-gamut. As the second lightness value of the RYG(W)K sub-gamut, being 2, is much lower than that of the YGB(W)K sub-gamut, being 61, for this point the RYG(W)K sub-gamut will be selected by the colour processing module. Suppose for instance that a pixel of the digital image is mapped and optionally matched on this point, then the image signal generation module of the image processing system converts the three image signals associated with the separation images of the RGB colours into three image signals associated with the separation images of the selected chromatic process colours, being RYG, and an additional image signal associated with the separation images of the additional process colour (blacK). In practice, image signals may be generated for all process colours (KRGBCMY) but the image density values for the colours BCM will be zero for this pixel as these process colours are not part of the selected sub-gamut.

Further to this example, the halftoning (also referred to as screening) technique used to convert the RYGK image signals into corresponding RYGK printing signals is a binary matrix-dither technique. The halftoning is performed using only up to three screens for the chromatic colours, each having a predetermined screen angle. R is screened using screen 1, Y is screened using screen 2, G is screened using screen 3 while an additional screen is provided for the additional black process colour. Each screen is a repetitive pattern of a predetermined matrix structure defining cells with associated image density threshold values. The matrix structure may differ for the respective screens. The size of each cell usually corresponds to the minimum image dot size which can be rendered by the printing unit. A printing signal associated with a separation image of a process colour is generated by comparing the image density value for that process colour for each pixel with a corresponding cell of the selected screen. If the image density value for that process colour for the pixel is equal to or higher than the threshold value of the corresponding cell, the printing signal indicates that an image dot of marking particles of that process colour is to be formed. If the image density value for that process colour for that pixel is below the threshold value, the printing signal indicates that no image dot of marking particles of that process colour is to be formed.

As a complementary image reproduction system can not render image portions with an area coverage value larger than 100%, amounts of the selected chromatic colours are replaced by black or blue in order to be able to adequately render the original image. This replacement is such that the total area coverage value of the rendered image portion is 100%. In the latter case, images can be rendered with only three screens as the last process colour to be printed can be printed by the complementary printing unit without using a screen.

The processing steps of the present invention (e.g., processes of the modules in FIG. 1) are implementable using existing computer programming language. Such computer program(s) may be stored in memories such as RAM,ROM, PROM, etc. associated with computers. Alternatively, such computer program(s) may be stored in a different storage medium such as a magnetic disc, optical disc, magneto-optical disc, etc. The computer programs are readable using a known computer or computer-based device.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims

The invention claimed is:

1. An image processing system for processing a digital multi-colour image for reproduction thereof on a colour image reproduction system provided with at least five process colours defining a gamut, the image processing system comprising:
   a colour processing module configured to divide the gamut into a plurality of sub-gamuts such that each sub-gamut is defined by a set of only three chromatic process colours of the at least five process colours, and to select for each pixel of the digital multi-colour image a corresponding sub-gamut from the plurality of sub-gamuts;
   an analysis module configured to judge, for each pixel of the digital multi-colour image, whether or not to add an additional process colour of the at least five process colours to the set of only three chromatic process colours; and
   a generation module configured to generate image signals from the digital multi-colour image, each image signal being associated with a digital separation image of a process colour of the plurality of process colours and specifying an image density value for the associated process colour for each pixel of the digital multi-colour image, the image density value for the associated process colour for the pixel being zero if the associated process colour is not part of the set of only three chromatic process colours defining the corresponding sub-gamut.

2. The image processing system as recited in claim 1, wherein each set of only three chromatic process colours defining a sub-gamut comprises a first process colour selected from the colours cyan, magenta and yellow, and a second process colour selected from the colours red, orange, green, blue, pink and brown.

3. The image processing system as recited in claim 2, wherein the first process colour and the second process colour are positioned adjacent to each other in a predetermined colour space.

4. The image processing system as recited in claim 1, wherein the analysis module is configured to determine for each pixel of the digital multi-colour image a lightness value and, if the lightness value is smaller than a predetermined lightness threshold, to make a judgment to add the additional process colour to the set of only three chromatic process colours defining the corresponding sub-gamut of said pixel.

5. The image processing system as recited in claim 1, wherein the analysis module is configured to determine for each pixel of the digital multi-colour image an area coverage value and, if the area coverage value equals or exceeds a predetermined coverage threshold, to make a judgment is made to add the additional process colour to the process colours defining the corresponding sub-gamut of said pixel.

6. The image processing system as recited in claim 1, wherein the additional process colour is a non-white achromatic process colour or blue.

7. The image processing system as recited in claim 1, further comprising:
   a conversion module for configured to convert the image signals of the associated process colours into corresponding printing signals by a halftoning technique using at most four different screens, wherein each image signal is converted into a corresponding printing signal using one screen selected from the at most four different screens.

8. The image processing system as recited in claim 5, wherein the predetermined coverage threshold is 100%.

9. The image processing system as recited in claim 7, wherein the conversion module is configured to convert the image signals into printing signals using up to three different screens.

10. A method for processing a digital multi-colour image for reproduction thereof on a colour image reproduction system provided with at least five process colours defining a gamut, the method comprising the steps of:
   dividing the gamut into a plurality of sub-gamuts such that each sub-gamut is defined by a set of only three chromatic process colours of the at least five process colours;
   selecting for each pixel of the digital multi-colour image a corresponding sub-gamut from the plurality of sub-gamuts;

judging for each pixel of the digital multi-colour image whether or not to add an additional process colour of the at least five process colours to the set of only three chromatic process colours; and generating image signals from the digital multi-colour image, each image signal being associated with a digital separation image of a process colour of the plurality of process colours and specifying an image density value for the associated process colour for each pixel of the digital multi-colour image, the image density value for the associated process colour for the pixel being zero if the associated process colour is not part of the set of only three chromatic process colours defining the corresponding sub-gamut.

11. The method as recited in claim 10, wherein each set of only three chromatic process colours defining a sub-gamut comprises a first process colour selected from the colours cyan, magenta and yellow, and a second process colour selected from the colours red, orange, green, blue, pink and brown.

12. The method as recited in claim 11, wherein the first process colour and the second process colour are positioned adjacent to each other in a predetermined colour space.

13. The method as recited in claim 10, wherein the judging step includes:
determining for each pixel of the digital multi-colour image a lightness value; and
if the lightness value is smaller than a predetermined lightness threshold, making a judgment to add the additional process colour to the set of only three chromatic process colours defining the corresponding sub-gamut of said pixel.

14. The method as recited in claim 10, wherein the judging step includes:
determining for each pixel of the digital multi-colour image an area coverage value; and
if the area coverage value equals or exceeds a predetermined coverage threshold, making a judgment to add the additional process colour to the process colours defining the corresponding sub-gamut of said pixel.

15. The method as recited in claim 10, wherein the additional process colour is a non-white achromatic process colour or blue.

16. The method as recited in claim 10, further comprising:
converting the image signals of the associated process colours into corresponding printing signals by a halftoning technique using at most four different screens, wherein each image signal is converted into a corresponding printing signal using one screen selected from the at most four different screens.

17. A computer program product embodied on at least one computer-readable medium, for processing a digital multi-colour image for reproduction thereof on a colour image reproduction system provided with at least five process colours defining a gamut, the computer program product comprising computer-executable instructions for:
dividing the gamut into a plurality of sub-gamuts such that each sub-gamut is defined by a set of only three chromatic process colours of the at least five process colours;
selecting for each pixel of the digital multi-colour image a corresponding sub-gamut from the plurality of sub-gamuts;
judging for each pixel of the digital multi-colour image whether or not to add an additional process colour of the at least five process colours to the set of only three chromatic process colours; and
generating image signals from the digital multi-colour image, each image signal being associated with a digital separation image of a process colour of the plurality of process colours and specifying an image density value for the associated process colour for each pixel of the digital multi-colour image, the image density value for the associated process colour for the pixel being zero if the associated process colour is not part of the set of only three chromatic process colours defining the corresponding sub-gamut.

18. The computer program as recited in claim 17, wherein the computer-executable instructions for judging include computer-executable instructions for:
determining for each pixel of the digital multi-colour image a lightness value; and if the lightness value is smaller than a predetermined lightness threshold, making a judgment is made to add the additional process colour to the set of only three chromatic process colours defining the corresponding sub-gamut of said pixel.

19. The computer program as recited in claim 17, wherein the computer-executable instructions for judging include computer-executable instructions for:
determining for each pixel of the digital multi-colour image an area coverage value; and
if the area coverage value equals or exceeds a predetermined coverage threshold, making a judgment to add the additional process colour to the process colours defining the corresponding sub-gamut of said pixel.

20. The computer program as recited in claim 17, wherein the additional process colour is a non-white achromatic process colour or blue.

21. The computer program as recited in claim 17, further comprising computer-executable instructions for:
converting the image signals of the associated process colours into corresponding printing signals by a halftoning technique using at most four different screens, wherein each image signal is converted into a corresponding printing signal using one screen selected from the at most four different screens.

* * * * *